United States Patent
Lee et al.

(10) Patent No.: US 12,136,709 B2
(45) Date of Patent: Nov. 5, 2024

(54) SYSTEM FOR AND METHOD OF MANUFACTURING LITHIUM ION SECONDARY BATTERY

(71) Applicants: HYUNDAI MOTOR COMPANY, Seoul (KR); KIA MOTORS CORPORATION, Seoul (KR)

(72) Inventors: Young Woo Lee, Suwon-si (KR); Yoon Ji Lee, Bucheon-si (KR); Hae Won Park, Anyang-si (KR); Sung Hoon Lim, Yongin-si (KR); Seung Ho Ahn, Hanam-si (KR); Sang Jin Park, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 405 days.

(21) Appl. No.: 16/909,349

(22) Filed: Jun. 23, 2020

(65) Prior Publication Data
US 2021/0167431 A1    Jun. 3, 2021

(30) Foreign Application Priority Data
Nov. 29, 2019  (KR) .................. 10-2019-0156297

(51) Int. Cl.
*H01M 10/44* (2006.01)
*H01M 10/0525* (2010.01)

(52) U.S. Cl.
CPC ..... *H01M 10/443* (2013.01); *H01M 10/0525* (2013.01); *H01M 10/445* (2013.01)

(58) Field of Classification Search
CPC ........... H01M 10/443; H01M 10/0525; H01M 10/445
See application file for complete search history.

(56) References Cited

U.S. PATENT DOCUMENTS

2011/0300437 A1* 12/2011 Yi .................. H01M 50/636
                                                      429/185
2013/0183565 A1*  7/2013 Zahn ................ H01M 50/105
                                                      429/120

(Continued)

FOREIGN PATENT DOCUMENTS

CN       101523637 A     9/2009
CN       106450464 A     2/2017

(Continued)

OTHER PUBLICATIONS

KR101838332B1—Machine Translation (Year: 2018).*
KR101713042B1—Machine Translation (Year: 2017).*

*Primary Examiner* — Brian R Ohara
*Assistant Examiner* — Patrick Marshall Greene
(74) *Attorney, Agent, or Firm* — MCDONNELL BOEHNEN HULBERT & BERGHOFF LLP

(57) ABSTRACT

A lithium ion secondary battery system includes a chamber to accommodate a lithium ion secondary battery, a charging/discharging device for electrically charging and discharging the lithium ion secondary battery, a pressure plate disposed in the chamber and configured to press the lithium ion secondary battery when the lithium ion secondary battery is electrically charged, a pointed portion disposed in the chamber and configured to bore a hole in a pouch of the lithium ion secondary battery to enable gas generated during the electrical charging of the lithium ion secondary battery to be removed from the pouch, and a sealer configured to seal the pouch after the gas is removed.

6 Claims, 6 Drawing Sheets

(56) References Cited

U.S. PATENT DOCUMENTS

| | | | |
|---|---|---|---|
| 2019/0207183 A1* | 7/2019 | Park | H01M 50/105 |
| 2019/0379083 A1* | 12/2019 | Jung | H01M 50/105 |
| 2020/0161698 A1* | 5/2020 | Higuchi | H01M 10/049 |
| 2022/0294024 A1* | 9/2022 | Choi | H01M 10/049 |

FOREIGN PATENT DOCUMENTS

| | | | |
|---|---|---|---|
| CN | 106605349 A | | 4/2017 |
| CN | 109478674 A | | 3/2019 |
| KR | 2015-0045097 A | | 4/2015 |
| KR | 2015-0062849 A | | 6/2015 |
| KR | 2015-0107102 A | | 9/2015 |
| KR | 101713042 B1 | * | 3/2017 |
| KR | 10-1820442 B1 | | 1/2018 |
| KR | 2018-0000605 A | | 1/2018 |
| KR | 101838332 B1 | * | 3/2018 |
| KR | 2018-0093792 A | | 8/2018 |

* cited by examiner

FIG. 5

|  | Comparative Example 1 (general finishing/ packaging) | Comparative Example 2 (pressure finishing/ packaging) | Present Disclosure |
|---|---|---|---|
| time for first charging | 6 hours | 1 hours | 1 hours |
| time for finishing /packaging | at least 187 hours | at least 182 hours | at least 79 hours |

SYSTEM FOR AND METHOD OF MANUFACTURING LITHIUM ION SECONDARY BATTERY

CROSS REFERENCE TO RELATED APPLICATIONS

The present application claims priority to Korean Patent Application No. 10-2019-0156297, filed Nov. 29, 2019, the entire contents of which is incorporated herein for all purposes by this reference

BACKGROUND

Field of the Disclosure

The present disclosure relates to a system for and a method of manufacturing a lithium ion secondary battery.

Description of the Related Art

In order to cope with air pollution and global warming, a reduction in emission of carbon dioxide is required. For this reason, recently, the automobile industry has made a great effort to commercialize electric vehicles or hybrid vehicles, and development of cost-effective and safe lithium ion secondary batteries for powering motors holds a key to the practical use of electrical vehicles or hybrid vehicles. Therefore, advanced lithium ion secondary batteries are being actively developed.

Production of a lithium ion secondary battery consists of three main process steps: electrode manufacturing, cell assembly, and cell formation. The cell formation refers to a process of forming a passivation film to prevent damage to a battery cell and to secure the function of the battery cell. Conventionally, such a formation process requires a long process time, a large space proportional to the process time, and many labor hours, resulting in low production productivity. The formation process also has a problem in that degassed gas 14 flows back into an electrode assembly as illustrated in FIG. 1, and thus cell performance is deteriorated due to the gas. In FIG. 1, the reference number 11 refers to a cathode, the reference number 12 refers to an anode, and the reference number 13 refers to a separation membrane.

The foregoing is intended merely to aid in understanding the background of the present disclosure and therefore should not be interpreted to admit that the present disclosure falls within the purview of the related art that is already known to those skilled in the art.

SUMMARY

The present disclosure provides a solution to the problems occurring in the related art. That is, an objective of the present disclosure is to provide a method of manufacturing a lithium ion secondary battery, the method being capable of preventing gas occurring during a battery finishing step from flowing back into an electrode assembly by removing the gas in real time. Another objective of the present invention is to provide a lithium ion secondary battery manufactured through the method.

In order to accomplish one objective of the present disclosure, according to one aspect of the present disclosure, there is provided a lithium ion secondary battery manufacturing system including: a chamber configured to contain a lithium ion secondary battery; a charging/discharging device configured to charge and discharge the lithium ion secondary battery contained in the chamber; a pressure plate provided in the chamber and configured to press the lithium ion secondary battery when the lithium ion secondary battery is electrically charged; a pointed portion provided in the chamber and configured to bore a hole in a pouch of the lithium ion secondary battery to enable gas generated during the electrical charging to be removed from the pouch when the pressure plate presses the lithium ion secondary battery; and a sealer configured to seal the pouch after the gas is removed.

The system may further include at least one of the following: a temperature control device provided in the chamber and configured to adjust an internal temperature of the chamber; multiple drive devices configured to drive the pressure plate, the pointed portion, and the sealer, respectively; a pump configured to create a vacuum pressure in the chamber; and a controller for controlling operation of the drive devices, the temperature control device, and the pump.

When the lithium ion secondary battery is electrically charged by the charging/discharging device, the controller may operate the pressure plate to press the lithium ion secondary battery, operate the temperature control device to raise or lower the internal temperature of the chamber, and operate the pointed portion to bore the hole in the pouch of the lithium ion secondary battery to enable the gas to be discharged out of the pouch in real time.

When the lithium ion secondary battery is electrically charged, the controller may operate the pressure plate to press the lithium ion secondary battery and operate the temperature control device to adjust the internal temperature of the chamber to be within a range of 0° to 80° C.

The controller may operate the pressure plate to apply a pressing force of 0 $Kgf/cm^2$ to 10 $Kgf/cm^2$ to the lithium ion secondary battery when the lithium ion secondary battery is electrically charged.

The controller may operate the pressure plate during the electrical charging or discharging of the lithium ion secondary battery so that the gas generated during the electrical charge and discharge can be removed.

The controller may operate the pressure plate immediately after the lithium ion secondary battery is electrically charged or discharged so that the gas generated during the electrical charging or discharging can be removed.

According to another aspect of the present disclosure, there is provided a method of manufacturing a lithium ion secondary battery, the method including: putting a lithium ion secondary battery into a chamber; pressing the lithium ion secondary battery by driving a pressure plate when the lithium ion secondary battery is electrically charged; and removing gas generated during the electrical charging of the lithium ion secondary battery by driving a pointed portion to bore a hole in a pouch of the lithium ion secondary battery.

The method may further include: operating a pump to create a vacuum pressure in the chamber before the removing of the gas.

During the pressing of the lithium ion secondary battery, a temperature control device may be operated to adjust an internal temperature of the chamber to be within a range of 0° to 80° C.

During the pressing of the lithium ion secondary battery, a pressing force of 0 $Kgf/cm^2$ to 10 $Kgf/cm^2$ may be applied to the lithium ion secondary battery.

With the use of the lithium ion secondary battery manufacturing system according to the present disclosure, when a lithium ion secondary battery is electrically charged, the pressure plate is driven to press the lithium ion secondary battery and the pointed portion is driven to bore a hole in the pouch of the lithium ion secondary battery so that gas generated during the electrical charging of the lithium ion secondary battery can be discharged to the outside of the pouch in real time. Therefore, it is possible to reduce time for initial charging of the lithium ion secondary battery and time for forming the lithium ion secondary battery, resulting improvement in the overall production productivity and efficiency of lithium ion secondary batteries.

The charging temperature at which the lithium ion secondary battery is electrically charged can be controlled with the temperature control device provided in the chamber. The resistance of the lithium ion secondary battery decreases as the charging temperature decreases. In the case of designing batteries that are for use in the field where safety is important, high-temperature charging may be selected to increase the battery cell resistance. On the other hand, in the case of designing batteries of which output power is important, low-temperature charging may be selected. That is, the battery cell resistance is adjusted according to the battery specifications required.

In addition, when the lithium ion secondary battery is electrically charged, the pressure plate is driven to press the lithium ion secondary battery and the pointed portion is driven to bore a hole in the pouch of the lithium ion secondary battery. In this way, the gas generated during the electrical charging of the lithium ion secondary battery can be removed from the pouch in real time. Therefore, it is possible to prevent the back flow of toxic gas into the electrode assembly in the lithium ion secondary battery, thereby preventing the capacity reduction attributable to side reactions (side effects) during the electrical charging or discharging of the lithium ion secondary battery and improving the practical service life of the lithium ion secondary battery.

BRIEF DESCRIPTION OF THE FIGURES

FIG. 5 is a diagram illustrating efficiencies of a conventional formation process, a conventional pressure formation process, and a formation process according to one embodiment of the present disclosure.

DETAILED DESCRIPTION

Figure 1:
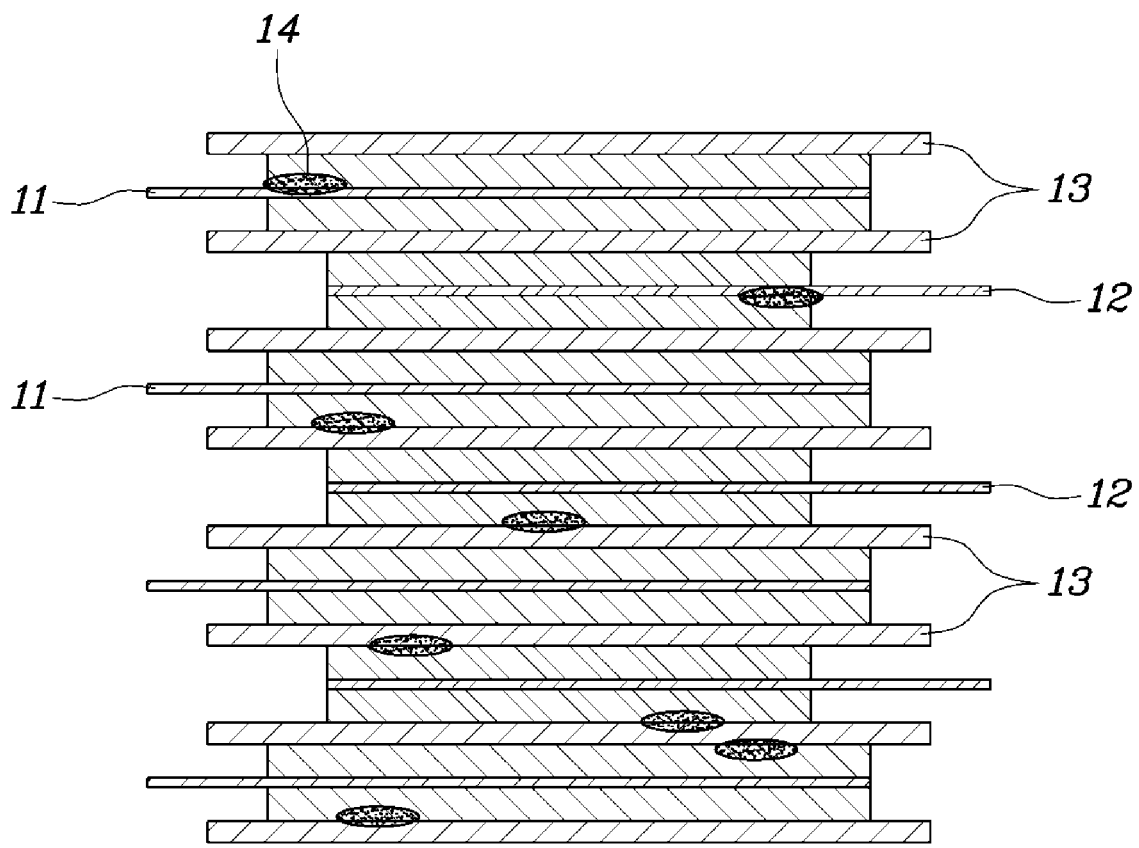
FIG. 1 is a view illustrating a state in which degassed gas flows back into an electrode assembly during a battery formation process according to a conventional art.

Hereinafter, exemplary embodiments of the present disclosure will be described with reference to the accompanying drawings. Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its invention in the best way possible.

The exemplary embodiments described herein and the configurations illustrated in the drawings are presented for illustrative purposes and do not exhaustively represent the technical spirit of the present invention. Accordingly, it should be appreciated that there will be various equivalents and modifications that can replace the exemplary embodiments and the configurations at the time at which the present application is filed.

Figure 2:
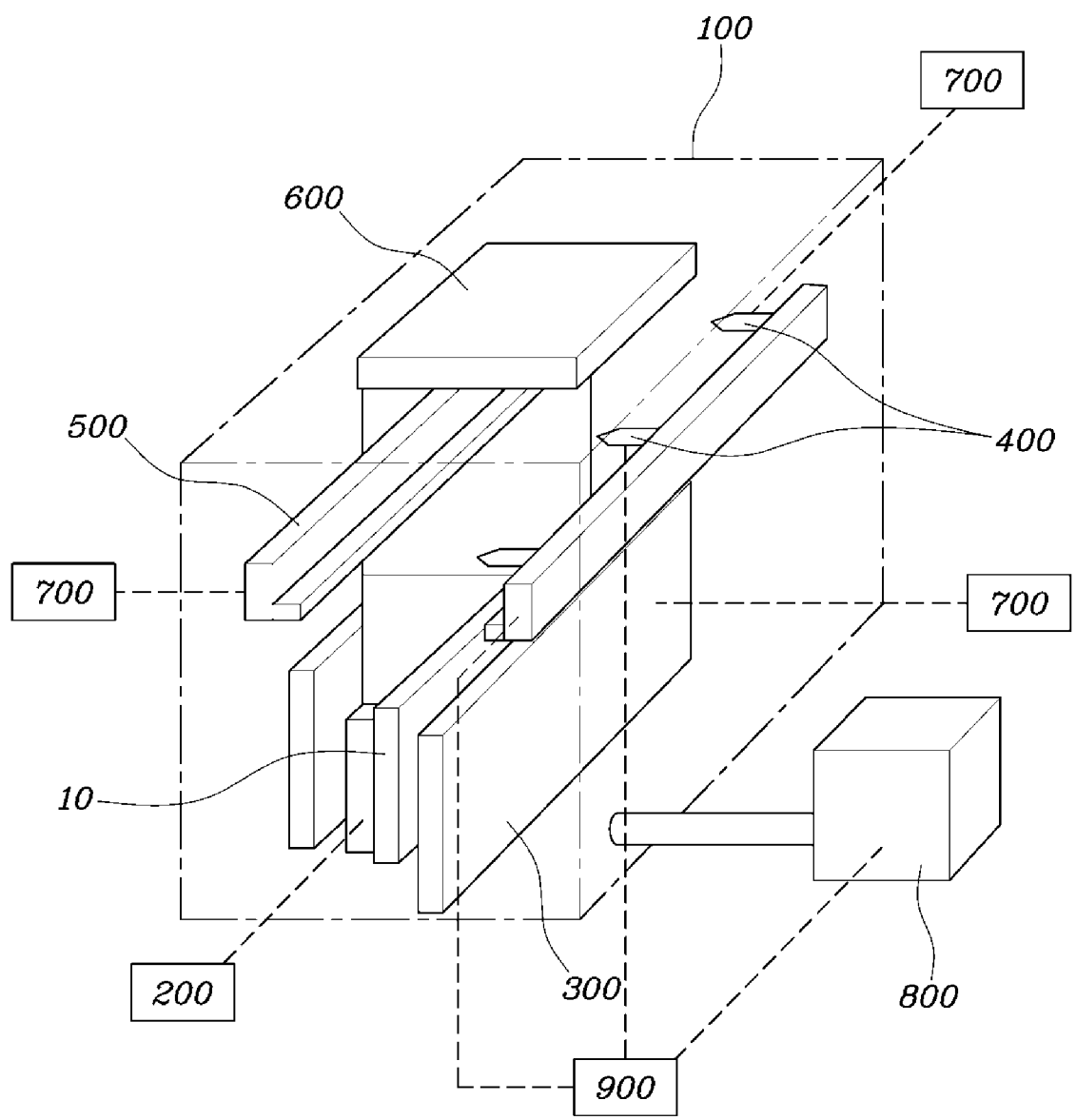
FIG. 2 is a view illustrating the overall construction of a lithium ion secondary battery manufacturing system according to one embodiment of the present disclosure.

FIG. 2 is a view illustrating the overall construction of a lithium ion secondary battery manufacturing system according to one embodiment of the present disclosure. Referring to FIG. 2, a lithium ion secondary battery manufacturing system according to an exemplary embodiment of the present disclosure includes a chamber 100, a charging/discharging device 200, a pressure plate 300, a pointed portion 400, and a sealer 500. The system may further include at least one device selected from among a temperature control device 600, multiple driving devices 700, a pump 800, and a controller 900.

Specifically, the chamber 100 has an accommodation space in which a lithium ion secondary battery 10 can be accommodated. The chamber 100 can block external air and can degas internal gas during electrical charging or discharging of the lithium ion secondary battery 10 contained in the chamber.

Although not illustrated in detail in the drawings, the chamber 100 may be provided with a connector (not illustrated) to be connected with the charging/discharging 200 and the pump 800.

The charging/discharging device 200 serves to electrically charge and discharge the lithium ion secondary battery 10 contained in the chamber 100. According to an embodiment of the present disclosure, the charging/discharging device 200 is provided in the chamber 100. According to another embodiment of the present disclosure, the charging/discharging device 200 may be provided outside the chamber 100. In this case, the charging/discharging device 200 may be connected to an electrode tab of the lithium ion secondary battery 10 via the connector (not illustrated) so that the lithium ion secondary battery 10 can be electrically charged and discharged.

The pressure plate 300 provided in the chamber 100 serves to press the lithium ion secondary battery 10 when the lithium ion secondary battery 10 is electrically charged. The area of the pressure plate 300 is preferably larger than the area of the lithium ion secondary battery 10. The pressure plate 300 needs to be small enough not to interfere with the operations of the pointed portion 400 and the sealer 500. The configuration in which the area of the pressure plate 300 is larger than the area of the lithium ion secondary battery 10 is required to apply the uniform pressing force to the lithium ion secondary battery 10.

The pointed portion 400 is disposed in the chamber 100 and is driven to bore a hole in the pouch of the lithium ion secondary battery 10 when the lithium ion secondary battery 10 is pressed by the pressure plate 300, thereby enabling the gas generated during the electrical charging of the lithium ion secondary battery to be discharged to the outside of the pouch. Normally, gas is generated during electrical charging or discharging of lithium ion secondary battery cells. Therefore, a lithium ion secondary battery has a gas room provided in the pouch thereof so that the generated gas can be collected in the gas room. The pointed portion 400 is disposed in the chamber 100 and is specifically disposed at a position corresponding to the gas room. Thus, when the pointed portion 400 is driven, the pouch is bored at the position where the gas room is provided so that the gas generated during the electrical charging can be removed from the electrode assembly through the hole.

The shape of the pointed portion 400 is not limited to a specific shape. The pointed portion 400 can have any shape if the pointed portion 400 can bore a hole in the pouch of the lithium ion secondary battery so that the gas during the electrical charging can be discharged to the outside of the pouch.

The sealer 500 blocks external air from being introduced into the pouch by sealing the pouch of the lithium ion secondary battery bored by the pointed portion 400 after the gas is discharged from the pouch.

The temperature control device 600 is disposed in the chamber 100 and serves to adjust the internal temperature of the chamber 100. In the lithium ion secondary battery manufacturing system according to the present disclosure, the temperature control device raises the temperature of the lithium ion secondary battery contained in the chamber by using heat radiation or convection.

A conventional pressure plate for pressing a lithium ion secondary battery is provided with heating wires buried therein. Thus, the temperature of a lithium ion secondary battery is increased and decreased in a conductive manner using the heating wires. However, in conventional cases, the heat of the heating wires is conducted only in a direction of thickness of a lithium ion secondary battery cell. Therefore, the flank surfaces of the lithium ion secondary battery cell easily experience heat loss, resulting in a temperature imbalance between the center of the cell and the flank surfaces of the cell. This causes a problem that the ionic conductivity is uneven and the adhesion between the separator and the electrode is uneven.

To solve this problem, the present disclosure uses the temperature control device 600 to uniformly raise and lower the temperature of the lithium ion secondary battery contained in the chamber through heat radiation or convection, thereby attaining the advantages of uniform ion conductivity across the entire area of the lithium ion secondary battery cell during electrical charging and discharging and of uniform adhesion between the separator and the electrode.

On the other hand, according to an exemplary embodiment of the present disclosure, the temperature control device 600 can be installed on or above the chamber 100. However, such an arrangement is only one example. The installation position of the temperature control device 600 is not particularly limited. The temperature control device 600 can be installed at any place if it can operate to increase or decrease the temperature of the air in the chamber 100 so that the lithium ion secondary battery 10 can be evenly heated when the lithium ion secondary battery is pressed by the pressure plate 300.

The multiple drive devices 700 serve to drive the pressure plate 300, the pointed portion 400, and the sealer 500. In other words, according to an exemplary embodiment of the present disclosure, the lithium ion secondary battery manufacturing system includes multiple drive devices for driving the pressure plate 300, the pointed portion 400, and the sealer 500, respectively. Depending on embodiment, the drive device may be motors.

The pump 800 serves to purging the inside of the chamber 100, thereby creating a vacuum pressure in the chamber 100.

In an exemplary embodiment of the present disclosure, when the pump 800 is driven to create a vacuum pressure in the chamber 100, the pouch of the lithium ion secondary battery is bored by the pointed portion 400 so that the gas collected in the gas room provided in the pouch can be discharged to the outside of the pouch.

The controller 900 controls the operations of the charging/discharging device 200, the temperature control device 600, the driver device 700, and the pump 800. Specifically, when the lithium ion secondary battery 10 is electrically charged by the charging/discharging device 200, the controller 900 controls the operation of the pressure plate 300 such that the lithium ion secondary battery is pressed by the pressure plate 300, controls the operation of the temperature control device 600 such that the internal temperature of the chamber 100 is raised or lowered, and controls the operation of the pointed portion 400 such that a hole is bored in the pouch of the lithium ion secondary battery so that the gas generated during the electrical charging of the lithium ion secondary battery can be removed in real time.

In detail, when the lithium ion secondary battery is electrically charged, the controller 900 controls the operation of the pressure plate 300 such that the lithium ion secondary battery is pressed. At this time, the pressure plate 300 presses the lithium ion secondary battery with a pressing force of 0 Kgf/cm$^2$ to 10 Kgf/cm$^2$.

In addition, when the lithium ion secondary battery 10 is electrically charged by the charging/discharging device, the controller 900 controls the operation of the pressure plate such that the lithium ion secondary battery is pressed and controls the operation of the temperature control device 600 such that the internal temperature of the chamber is adjusted to be within a range of 0° to 80° C. Depending on embodiment, when the lithium ion secondary battery 10 is electrically charged by the charging/discharging device, the controller 900 controls the operation of the pressure plate such that the lithium ion secondary battery is pressed and controls the operation of the temperature control device 600 such that the internal temperature of the chamber is adjusted to be 60° C. However, 60° is only an exemplary temperature, and the internal temperature which is to be reached may be determined according to the pressing force applied to the lithium ion secondary battery and other conditions including the resistance, output power, capacity, and the like of the lithium ion secondary battery.

According to an embodiment of the present disclosure, the controller 900 may drive the pressure plate during electrical charging/discharging of the lithium ion secondary battery so that the gas generated during the electrical charging/discharging can be discharged to the outside of the pouch. According to another embodiment, the controller 900 may drive the pressure plate immediately after the electrical charging/discharging of the lithium ion secondary battery is finished so that the gas generated during the electrical charging/discharging can be discharged to the outside of the pouch.

Figure 3:
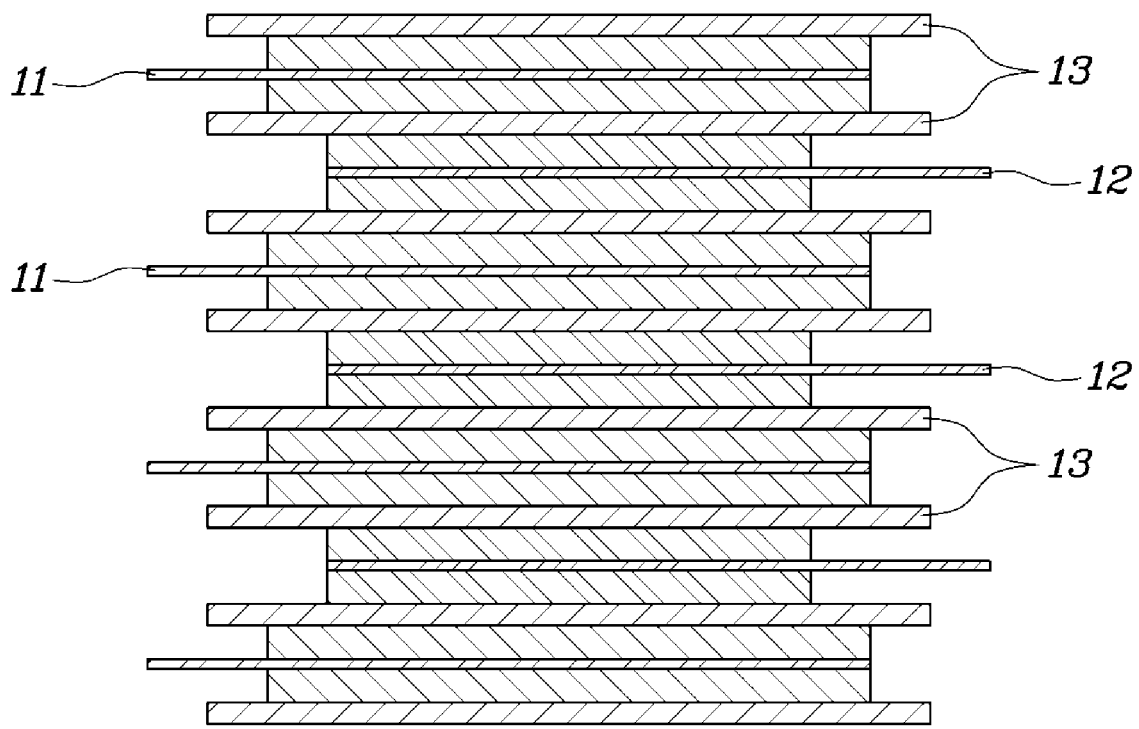
FIG. 3 is a cross-sectional view of an electrode assembly of a lithium ion secondary battery that is finished/packaged by using the manufacturing system according to one embodiment of the present disclosure.

FIG. 3 is a cross-sectional view of an electrode assembly of a lithium ion secondary battery which is finished/packaged by using a lithium ion secondary battery manufacturing system according to one embodiment of the present disclosure. FIG. 3 shows a cathode 11, an anode 12, and a separation membrane 13. Referring to FIG. 3, with the use of the lithium ion secondary battery manufacturing system according to an embodiment of the present disclosure, when the lithium ion secondary battery is electrically charged, the pressure plate is driven to press the lithium ion secondary battery and the pointed portion is driven to bore a hole in the pouch of the lithium ion secondary battery so that gas generated during the electrical charging of the lithium ion secondary battery can be discharged to the outside of the pouch in real time. Therefore, it is possible to reduce the time for the first charging performed for activation of the lithium ion secondary battery and the time for formation the lithium ion secondary battery, resulting improvement in the overall production productivity and efficiency of the lithium ion secondary battery.

Figure 4:
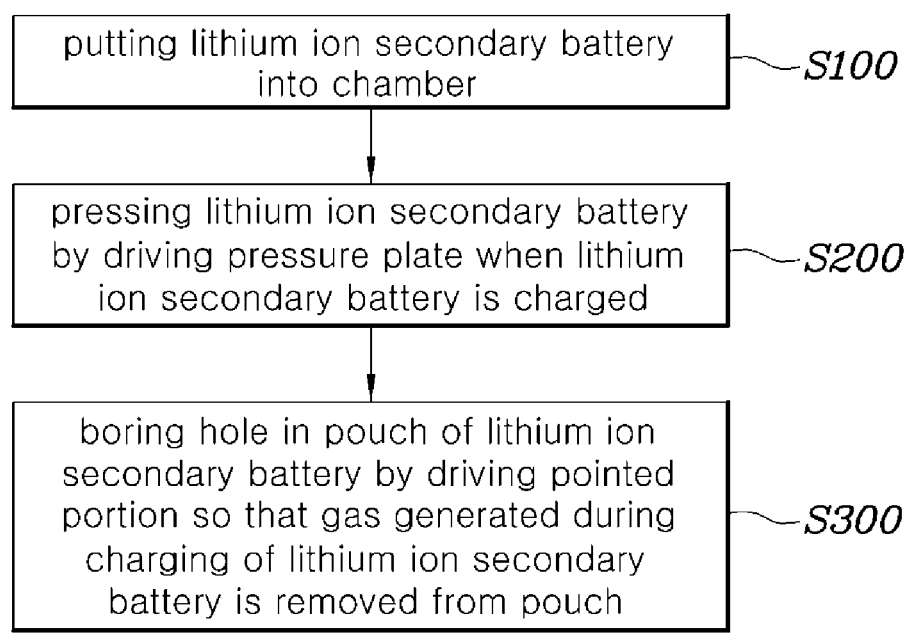
FIG. 4 is a flowchart illustrating a method of manufacturing a lithium ion secondary battery according to one embodiment of the present disclosure.

FIG. 4 is a flowchart illustrating a method of manufacturing a lithium ion secondary battery according to one embodiment of the present disclosure. Referring to FIG. 4, the method of manufacturing a lithium ion secondary battery, according to an embodiment of the present disclosure, includes: Step S100 of putting a lithium ion secondary battery into a chamber; Step S200 of pressing the lithium ion secondary battery by driving a pressure plate when the lithium ion secondary battery is electrically charged; Step S300 of discharging gas generated during the electrical charging of the lithium ion secondary battery by boring a hole in a portion of the pouch of the lithium ion secondary battery by driving a pointed portion.

Before the boring of the hole in the pouch of the lithium ion secondary battery, a step of creating a vacuum pressure in the chamber may be performed by driving a pump.

When the lithium ion secondary battery is electrically charged, at the step of driving the pressure plate to press the lithium ion secondary battery, a temperature control device is operated to adjust an internal temperature of the chamber to be within a range of 0° to 80° C. According to one embodiment, when the lithium ion secondary battery is electrically charged, at the step of driving the pressure plate to press the lithium ion secondary battery, the temperature control device is operated to adjust the internal temperature of the chamber to be 60° C. However, 60° is only an exemplary temperature, and the internal temperature which is to be reached may be determined according to the pressing force applied to the lithium ion secondary battery and other conditions such as the capacity of the lithium ion secondary battery.

When the lithium ion secondary battery is electrically charged, at the step of driving the pressure plate to press the lithium ion secondary battery, a pressing force of 0 Kgf/cm$^2$ to 10 Kgf/cm$^2$ is applied to the lithium ion secondary battery.

Figure 6:
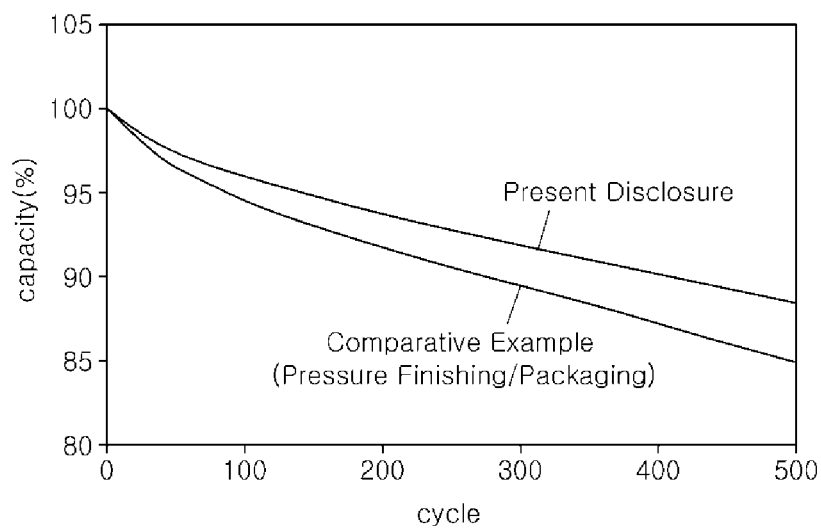
FIG. 6 is a diagram illustrating lifespans of lithium ion secondary batteries manufactured through the conventional formation process and the finishing process according to the present disclosure, respectively.
Figure 6:
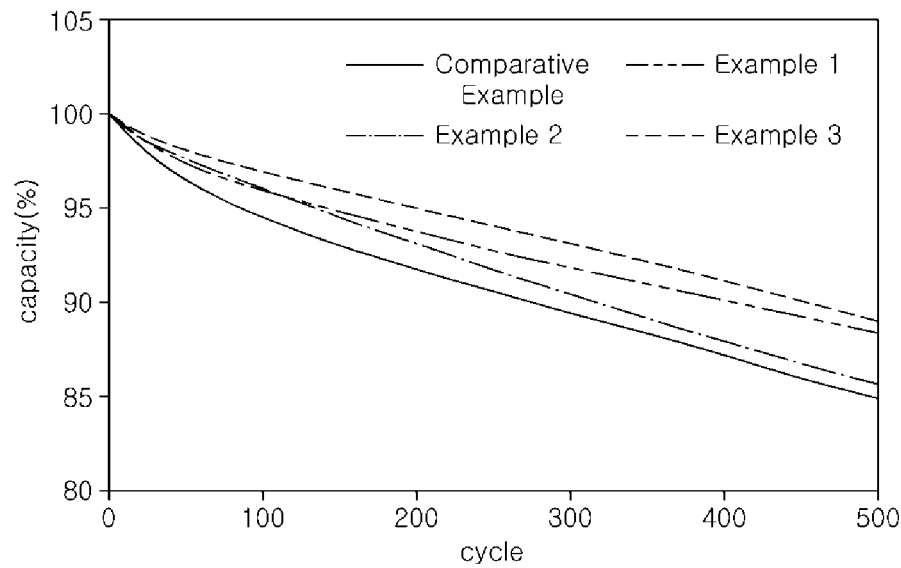

FIG. 5 is a diagram illustrating the efficiency of a conventional formation process, the efficiency of a conventional formation process, and the efficiency of a pressure formation process according to one exemplary embodiment of the present disclosure, and FIG. 6 is a diagram illustrating comparison between the lifespan of a lithium ion secondary battery manufactured through the conventional formation process and the lifespan of a lithium ion secondary battery manufactured through the pressure formation process according to one embodiment of the present disclosure.

Referring to FIG. 5, with the use of a lithium ion secondary battery manufacturing system according to one embodiment of the present disclosure, when a lithium ion secondary battery is electrically charged, a pressure plate is driven to press the lithium ion secondary battery and a pointed portion is driven to bore a hole in the pouch of the lithium ion secondary battery so that gas generated during the electrical charging of the lithium ion secondary battery is discharged to the outside of the pouch in real time. Therefore, it is possible to reduce the time for the first charging of the lithium ion secondary battery and the time for formation the lithium ion secondary battery, resulting improvement in the overall production productivity and efficiency of lithium ion secondary batteries.

In addition, referring to FIG. 6, with the use of a lithium ion secondary battery manufacturing system according to an embodiment of the present disclosure, when a lithium ion secondary battery is electrically charged, a pressure plate is driven to press the lithium ion secondary battery and a pointed portion is driven to bore a hole in the pouch of the lithium ion secondary battery. In this way, the gas generated during the electrical charging of the lithium ion secondary battery can be removed from the pouch in real time. Therefore, it is possible to prevent the back flow of toxic gas into an electrode assembly of the lithium ion secondary battery, thereby preventing the capacity reduction attributable to side reactions (i.e., side effects) during the electrical charging and discharging of the lithium ion secondary battery, resulting in improvement in the practical service life of the lithium ion secondary battery. In particular, under the condition in which a pressing force of 0 to 10 Kgf/cm$^2$ is applied to the lithium ion secondary battery, it is possible to ensure a longer service life than comparative examples. When the pressing force is excessively large, there is a risk that electrolyte held in an electrode or a separator oozes out of the electrode or the separator, thereby shortening the service life of the lithium ion secondary battery. Therefore, the pressing force applied to the lithium ion secondary battery is preferably not stronger than 10 Kgf/cm$^2$.

Referring to FIG. 6, the DC cell resistance decreases with decreasing temperature at which the pressure formation is performed. Conversely, the higher the temperature, the higher the DC cell resistance. This is because the properties of a passivation film change with temperature. Since the DC cell resistance has a negative correlation with the output power, the cell resistance is adjusted by varying the temperature at which the formation process is performed according to the specifications of the battery. However, since the DC-IR rapidly increases and there is concern that side reactions occur at a temperature of 85° C., the temperature is preferably set to be lower than 85°.

While the disclosure has been described with reference to the accompanying drawings and the preferred embodiments described above, the disclosure is not limited thereto, but is defined by the claims. Accordingly, those skilled in the art may variously change and modify the present disclosure without departing from the technical spirit of the appended claims.

The invention claimed is:
1. A lithium ion secondary battery manufacturing system comprising:
 a single chamber comprising:
  lithium ion secondary battery;
  a charging/discharging device configured to electrically charge and discharge the lithium ion secondary battery;
  a pressure plate configured to press the lithium ion secondary battery when the lithium ion secondary battery is electrically charged;
  a pointed portion configured to bore a hole in a pouch of the lithium ion secondary battery to allow gas generated during the electrical charging of the lithium ion secondary battery to be removed from the pouch when the lithium ion secondary battery is pressed by the pressure plate;
  a sealer configured to seal the pouch of the lithium ion secondary battery by closing the hole after the gas is removed;

a temperature control device configured to control an internal temperature of the chamber; and multiple drive devices configured to drive the pressure plate, the pointed portion, and the sealer;

wherein when the lithium ion secondary battery is electrically charged by the charging/discharging device, the controller operates the pressure plate to press the lithium ion secondary battery, operates the temperature control device to raise or lower the internal temperature of the chamber, and operates the pointed portion to bore the hole in the pouch of the lithium ion secondary battery to enable the gas to be removed from the pouch in real time.

2. The lithium ion secondary battery manufacturing system according to claim 1, further comprising at least one of the following:

a pump configured to create a vacuum pressure in the chamber; and a controller configured to control operation of each of the drive devices, the temperature control device, and the pump.

3. The lithium ion secondary battery manufacturing system according to claim 2, wherein when the lithium ion secondary battery is electrically charged, the controller operates the pressure plate to press the lithium ion secondary battery and operates the temperature control device to adjust the internal temperature of the chamber to a temperature within a range of 0° to 80° C.

4. The lithium ion secondary battery manufacturing system according to claim 2, wherein the controller operates the pressure plate to apply a pressing force of 0 Kgf/cm$^2$ to 10 Kgf/cm$^2$ to the lithium ion secondary battery when the lithium ion secondary battery is electrically charged.

5. The lithium ion secondary battery manufacturing system according to claim 2, wherein the controller operates the pressure plate during the electrical charging or discharging of the lithium ion secondary battery so that the gas generated during the electrical charging or discharging is removed.

6. The lithium ion secondary battery manufacturing system according to claim 2, wherein the controller operates the pressure plate immediately after the electrical charging or discharging of the lithium ion secondary battery so that the gas generated during the electrical charging or discharging is removed.

* * * * *